United States Patent
Oh et al.

(10) Patent No.: US 9,912,180 B2
(45) Date of Patent: Mar. 6, 2018

(54) CHARGE DEVICE FOR BATTERY CHARGING AND METHOD THEREOF

(71) Applicant: Samsung Electronics Co., Ltd., Gyeonggi-do (KR)

(72) Inventors: Se-Won Oh, Gyeonggi-do (KR); Won-Bae Jung, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 428 days.

(21) Appl. No.: 14/595,679

(22) Filed: Jan. 13, 2015

(65) Prior Publication Data

US 2015/0200560 A1    Jul. 16, 2015

(30) Foreign Application Priority Data

Jan. 13, 2014 (KR) .................. 10-2014-0004210

(51) Int. Cl.
*H02J 7/00* (2006.01)

(52) U.S. Cl.
CPC .......... *H02J 7/0047* (2013.01); *H02J 7/0031* (2013.01)

(58) Field of Classification Search
CPC ................................................... H02J 7/0072
USPC ........................................................ 320/164
See application file for complete search history.

(56) References Cited

U.S. PATENT DOCUMENTS

| | | | | |
|---|---|---|---|---|
| 5,818,202 A * | 10/1998 | Miyamoto | ............ | H01M 10/44 320/125 |
| 6,075,339 A * | 6/2000 | Reipur | ............. | H01M 10/4257 320/110 |
| 6,424,123 B1 * | 7/2002 | Odaohhara | ........... | H02J 7/0073 320/134 |
| 7,626,353 B2 * | 12/2009 | Kanouda | ................... | G06F 1/26 307/46 |
| 7,990,106 B2 * | 8/2011 | Hussain | .................. | H02J 7/045 320/128 |
| 2006/0145658 A1 * | 7/2006 | Wang | .................... | H02J 7/0047 320/107 |
| 2013/0162194 A1 | 6/2013 | Woo | | |
| 2013/0162196 A1 * | 6/2013 | Li | .......................... | H02J 7/045 320/107 |
| 2013/0175248 A1 | 7/2013 | De Rosa | | |

* cited by examiner

*Primary Examiner* — Yalkew Fantu

(57) ABSTRACT

A charge device for controlling an abnormal charge request is provided. The charge device includes a controller that interrupts a charge path, when power is applied and that determines whether a charge request is an abnormal charge request through a detour charge path and that controls to maintain interruption of the charge path, if the charge request is an abnormal charge request. The controller may be further configured to interrupt the detour charge path, in response to determining that the charge request is a normal charge request; connect the charge path; and supply a charge current to the charge path.

20 Claims, 7 Drawing Sheets

CHARGE DEVICE FOR BATTERY CHARGING AND METHOD THEREOF

PRIORITY

The present application is related to and claims the benefit under 35 U.S.C. § 119(a) of a Korean patent application No. 10-2014-0004210 filed in the Korean Intellectual Property Office on Jan. 13, 2014, the entire disclosure of which is hereby incorporated by reference.

TECHNICAL FIELD

The present disclosure relates to a charge device for controlling an abnormal charge request.

BACKGROUND

A portable electronic device may use a battery as a power source. Nowadays, as an electronic device is advanced to a smart device, use of Internet and an application increases and thus a size of a display thereof increases, and a resolution of the display and a performance of a central processor are enhanced, and thus a battery consumption amount increases. Accordingly, in order to charge a battery, the number using a charger naturally increases.

In a method of operating a charger, when the charger is connected to a power supply device (a socket of a wall), the charger advances to a preparation step of supplying charge power through an output terminal, and when a load occurs between a power terminal and a ground (GND) terminal of the output terminal, the charger may recognize this as a situation to perform charge and supply charge power through the output terminal.

However, the charger cannot determine whether a load occurring between the power terminal and the GND terminal of the output terminal is a load according to an abnormal charge request by a foreign substance or a load according to a normal charge request by a charge target device.

SUMMARY

To address the above-discussed deficiencies, it is a primary object to provide a charge device for controlling an abnormal charge request and a method of operating the same.

Another aspect of the present disclosure is to provide a charge device for interrupting a charge path, when power is applied and a method of operating the same.

Another aspect of the present disclosure is to provide a charge device for determining whether a charge request is an abnormal charge request based on a current change and a method of operating the same.

Another aspect of the present disclosure is to provide a charge device for determining whether a charge request is an abnormal charge request based on a voltage change and a method of operating the same.

In accordance with an aspect of the present disclosure, a charge device includes: a controller that interrupts a charge path, when power is applied and that determines whether a charge request is an abnormal charge request through a detour charge path and that controls to maintain interruption of the charge path, if a charge request is an abnormal charge request.

The charge device may further include a Field Effect Transistor (FET) element to interrupt or connect the charge path or the detour charge path.

The charge device may further include a Low Drop Out (LDO) element for lowering and supplying a voltage through the detour charge path.

The controller may control to interrupt the detour charge path, if a charge request is a normal charge request, to connect the charge path, and to supply a charge current to the charge path.

The controller compares a voltage measured through the detour charge path and a reference voltage and determines whether a charge request is an abnormal charge request.

The controller compares a current measured through the detour charge path and a reference current and determines whether a charge request is an abnormal charge request.

The charge device further includes at least one of a display, an indicating lamp, a speaker, and a vibration generator notifying the abnormal charge request.

In accordance with another aspect of the present disclosure, a method of controlling charge in a charge device includes: interrupting a charge path, when power is applied; determining whether a charge request is an abnormal charge request through a detour charge path; and maintaining, if a charge request is an abnormal charge request, interruption of the charge path.

The method further includes interrupting or connecting the charge path or the detour charge path using a switch.

The determining of whether a charge request includes comparing a voltage measured through the detour charge path and a reference voltage and determining whether a charge request is an abnormal charge request.

The determining of whether a charge request includes comparing a current measured through the detour charge path and a reference current and determining whether a charge request is an abnormal charge request.

The method may further include notifying, if a charge request is an abnormal charge request, the abnormal charge request through at least one of a display, an indicating lamp, a speaker, and a vibration generator.

The method further includes interrupting, if a charge request is a normal charge request, the detour charge path, connecting the charge path, and supplying a charge current to the charge path.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, an operation principle of various exemplary embodiments of the present disclosure will be described in detail with reference to the accompanying drawings. Further, detailed descriptions of well-known functions and structures incorporated herein may be omitted to avoid obscuring the subject matter of the present disclosure. The terms used herein are defined in consideration of the functions of the present disclosure. Thus, the terms may vary depending on a user's or an operator's intension and usage. Therefore, the terms used herein should be understood based on the descriptions made herein.

Figure 1:
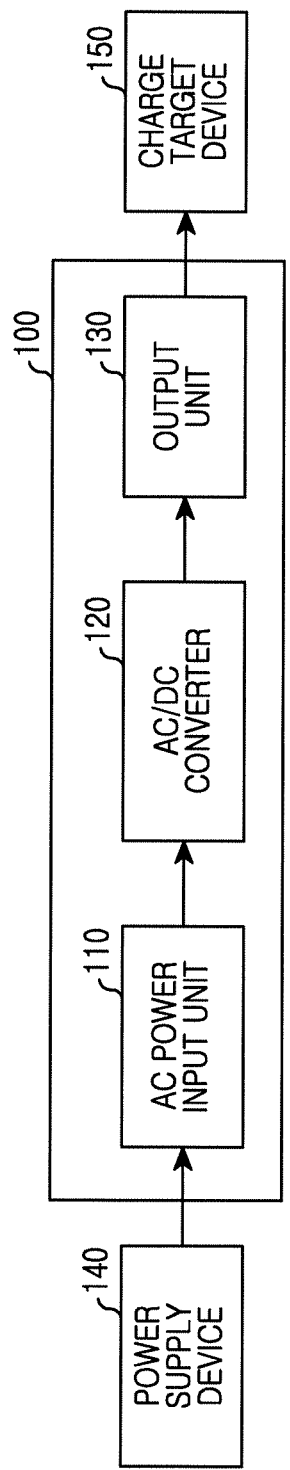
FIG. 1 is a block diagram illustrating a configuration of a conventional electronic device.

FIG. 1 is a block diagram illustrating a configuration of a conventional electronic device.

Referring to FIG. 1, an electronic device 100 may include an AC power input unit 110, an AC/DC converter 120, and an output unit 130. According to an exemplary embodiment, the electronic device 100 may be a Travel Adapter (TA) charge device.

The AC power input unit 110 may receive an input of AC power (e.g., 100V-230V) from a power supply device 140. In order to connect to the power supply device 140, the AC power input unit 110 may include a plug. According to an exemplary embodiment, when a user inserts a plug of the electronic device 100 into a plug socket or a socket provided at a house, the AC power input unit 110 may receive AC power. The AC power input unit 110 may output AC power received through a connection path to the AC/DC converter 120.

The AC/DC converter 120 may convert AC power received from the AC power input unit 110 to DC power. The AC/DC converter 120 may provide the converted DC power to the output unit 130 through a connection path.

The output unit 130 may output DC power received through a connection path to the AC/DC converter 120 to a charge target device 150.

When a load occurs between a power supply terminal and a GND terminal of the output unit 130, the electronic device 100 may recognize this as a situation to perform charge and provide a charge current. According to an exemplary embodiment, the output unit 130 may not determine whether a load between a power supply terminal and a GND terminal of the output unit 130 occurs by the charge target device 150 or occurs by a short circuit phenomenon by a foreign substance.

Hereinafter, various exemplary embodiments in which the electronic device controls an abnormal charge request will be described.

Figure 2:
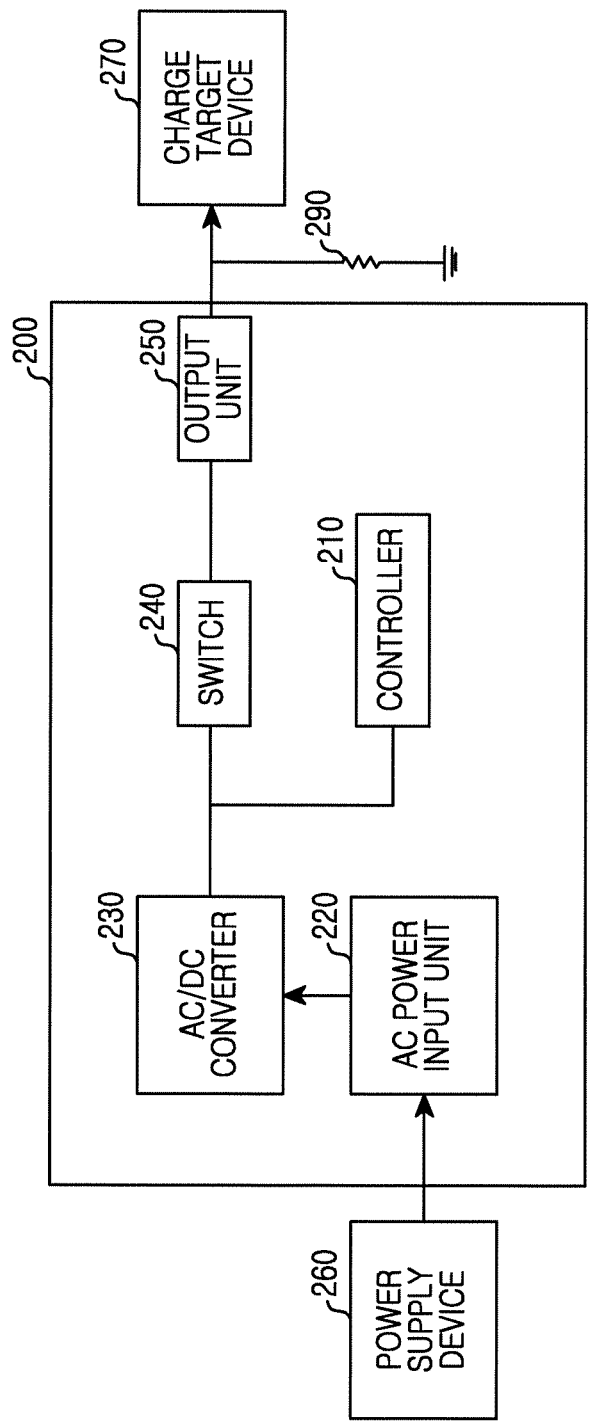
FIG. 2 is a block diagram illustrating a configuration of an electronic device according to various exemplary embodiments of the present disclosure.

FIG. 2 is a block diagram illustrating a configuration of an electronic device according to various exemplary embodiments of the present disclosure.

Referring to FIG. 2, an electronic device 200 may include a controller 210, an AC power input unit 220, an AC/DC converter 230, a switch 240, and an output unit 250. According to an exemplary embodiment, the electronic device 200 may be a TA charge device.

The AC power input unit 220 may receive an input of AC power (e.g., 100V-230V) from a power supply device 260. In order to connect to the power supply device 260, the AC power input unit 220 may include a plug. According to an exemplary embodiment, when a user inserts a plug of the electronic device 200 into a plug socket or a socket provided at a house, the AC power input unit 220 may receive AC power. The AC power input unit 220 may output AC power received through a connection path to the AC/DC converter 230.

The AC/DC converter 230 may convert AC power received from the AC power input unit 220 to DC power. The AC/DC converter 230 may provide the converted DC power to the output unit 250 through a connection path.

The output unit 250 may output DC power received through a connection path to the AC/DC converter 230 to a charge target device 270. The output unit 250 may include a male connector (plug) or a female connector that can electrically connect to a connector of the charge target device 270. The output unit 250 may include a male connector (plug) or a female connector that can electrically connect to a connector of a cable. The output unit 250 may include a cable having a male connector (plug) or a female connector in an end portion. Additionally, the male connector or the female connector of the output unit 250 may include a plurality of terminals.

The switch 240 may interrupt or connect a connection path between the AC/DC converter 230 and the output unit 250 according to the control of the controller 210. According to an exemplary embodiment, as the switch 240 sets interruption of a connection path between the AC/DC converter 230 and the output unit 250 as basic setting, even if an abnormal charge request occurs by a foreign substance 290, the switch 240 may prevent charge power (e.g., DC power) from unconditionally providing.

The controller 210 may determine whether a charge request from the charge target device 270 is a normal charge request based on whether a current or a voltage is changed and control to supply DC power to the charge target device 270. According to an exemplary embodiment, when it is recognized that an abnormal charge request has occurred by the foreign substance 290 based on whether a current or a voltage is changed, the controller 210 controls the switch 240 to maintain interruption of a connection path between the AC/DC converter 230 and the output unit 250. According to an exemplary embodiment, when it is recognized that a normal charge request has occurred based on whether a current or a voltage is changed, the controller 210 may control the switch 240 to connect a connection path between the AC/DC converter 230 and the output unit 250 and to supply DC power to the charge target device 270.

Although not shown, the electronic device 200 may include at least one of a display, an indicating lamp, a speaker, and a vibration generator notifying an abnormal charge request.

In FIG. 2, a configuration of the electronic device for determining whether a charge request is a normal charge request based on whether a current or a voltage is changed has been described.

Figure 3:
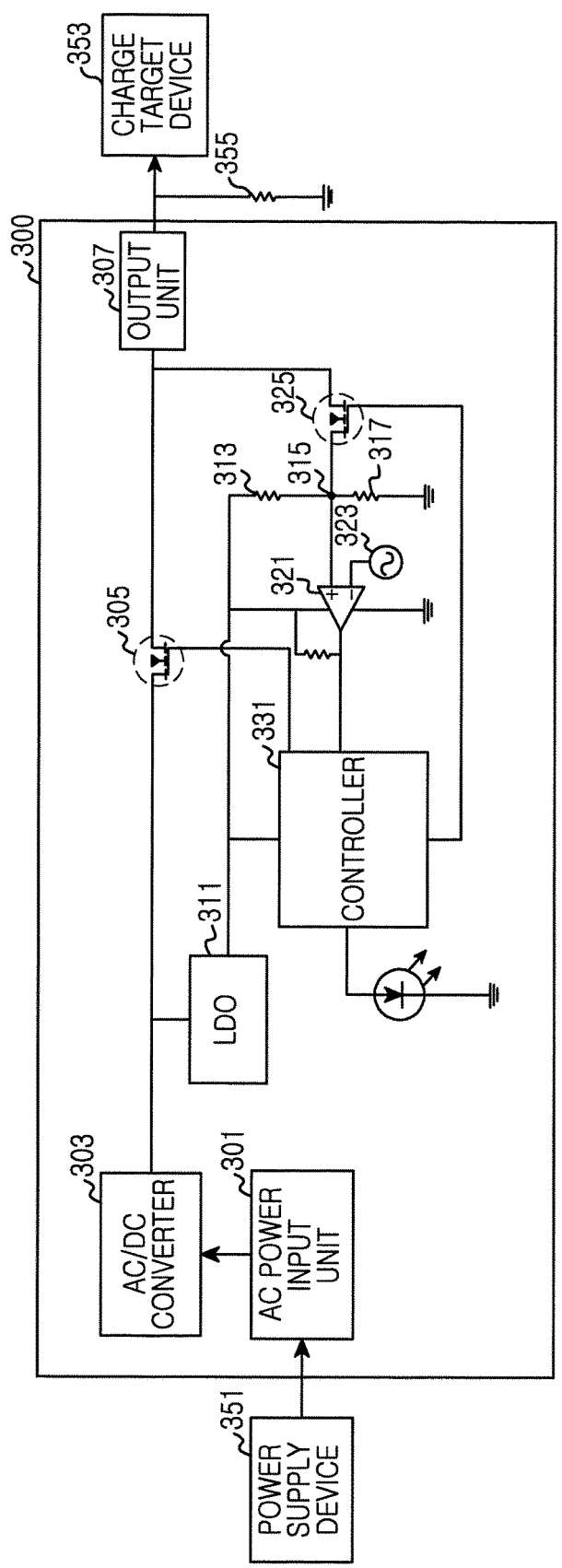
FIG. 3 is a block diagram illustrating a configuration of an electronic device for determining whether a charge request is a normal charge request based on whether a voltage is changed according to various exemplary embodiments of the present disclosure.

FIG. 3 illustrates a detailed configuration of an electronic device for determining whether a charge request is a normal charge request based on whether a voltage is changed.

FIG. 3 is a block diagram illustrating a configuration of an electronic device for determining whether a charge request is a normal charge request based on whether a voltage is changed according to various exemplary embodiments of the present disclosure.

Referring to FIG. 3, an electronic device 300 may include a controller 331, an AC power input unit 301, an AC/DC converter 303, a first switch 305, a Low Drop Out (LDO) 311, a comparator 321, and an output unit 307. According to an exemplary embodiment, the electronic device 300 may be a TA charge device.

The AC power input unit 301 may receive an input of AC power from a power supply device 351. In order to connect to the power supply device 351, the AC power input unit 301 may include a plug. According to an exemplary embodiment, when a user inserts a plug of the electronic device 300 into a plug socket or a socket provided at a house, the AC power input unit 301 may receive AC power. The AC power input unit 301 may output AC power received through a connection path to the AC/DC converter 303.

The AC/DC converter 303 may convert AC power received from the AC power input unit 301 to DC power. The AC/DC converter 303 may provide the converted DC power to the LDO 311 or the output unit 307 through a connection path.

The output unit 307 may output DC power received through a connection path to the AC/DC converter 303 to a charge target device 353. The output unit 307 may include a male connector (plug) or a female connector that can electrically connect to a connector of the charge target device 353. The output unit 307 may include a male connector (plug) or a female connector that can electrically connect to a connector of a cable. The output unit 307 may include a cable having a male connector (plug) or a female connector in an end portion. According to an exemplary embodiment, the male connector or the female connector of the output unit 307 may include a plurality of terminals.

The first switch 305 may interrupt or connect a connection path between the AC/DC converter 303 and the output unit 307 according to the control of the controller 331. According to an exemplary embodiment, as the first switch 305 sets interruption of a connection path between the AC/DC converter 303 and the output unit 307 as basic setting, even if an abnormal charge request occurs by a foreign substance 355, the first switch 305 may prevent charge power (e.g., DC power) from unconditionally providing. According to an exemplary embodiment, the first switch 305 may be formed with a Field Effect Transistor (FET) element.

The LDO 311 may lower and provide a voltage of DC power received from the AC/DC converter 303 to a predetermined level. According to an exemplary embodiment, when a chargeable voltage of the charge target device 353 is 5V, the AC/DC converter 303 converts a voltage of AC power received from the AC power input unit 301 to 5V and provides 5V to the LDO 311, and according to an exemplary embodiment, in order to determine whether an abnormal charge request occurs by the foreign substance 355 other than the charge target device 353, the LDO 311 may provide a voltage (e.g., 3V) lower than 5V, which is a normal charge voltage.

The comparator 321 may compare a measured voltage 315 and a reference voltage 323 and determine whether an abnormal charge request occurs by the foreign substance 355. According to an exemplary embodiment, the comparator 321 may receive a voltage of 3V from the LDO 311, and when a first resistor 313 and a second resistor 317 have 10 kΩ as equivalent resistance, the normal voltage 315 may be 1.5V. When resistance occurs by the foreign substance 355, a voltage lower than 1.5V may be measured as the voltage 315, and according to an exemplary embodiment, it may be recognized that an abnormal charge request has occurred through comparison with the reference voltage 323. That is, in a voltage lower than 5V, because the charge target device 353 cannot be charged, a voltage change in a voltage lower than 5V may be recognized as an abnormal charge request.

The controller 331 may determine whether a charge request from the charge target device 353 is a normal charge request based on whether a voltage is changed and control to supply DC power to the charge target device 353. According to an exemplary embodiment, when it is recognized that an abnormal charge request has occurred by the foreign substance 355 through the comparator 321, the controller 331 controls the first switch 305 to maintain interruption of a connection path between the AC/DC converter 303 and the output unit 307. According to an exemplary embodiment, when it is recognized that a normal charge request has occurred through the comparator 321, the controller 331 may control the first switch 305 to connect a connection path between the AC/DC converter 303 and the output unit 307 to supply DC power to the charge target device 353. According to an exemplary embodiment, the controller 331 may control a second switch 325 to interrupt a connection path connected to determine whether a charge request is an abnormal charge request. Here, the second switch 325 may be formed with an FET element.

Although not shown, the electronic device 300 may include at least one of a display, an indicating lamp, a speaker, and a vibration generator notifying an abnormal charge request.

Figure 4:
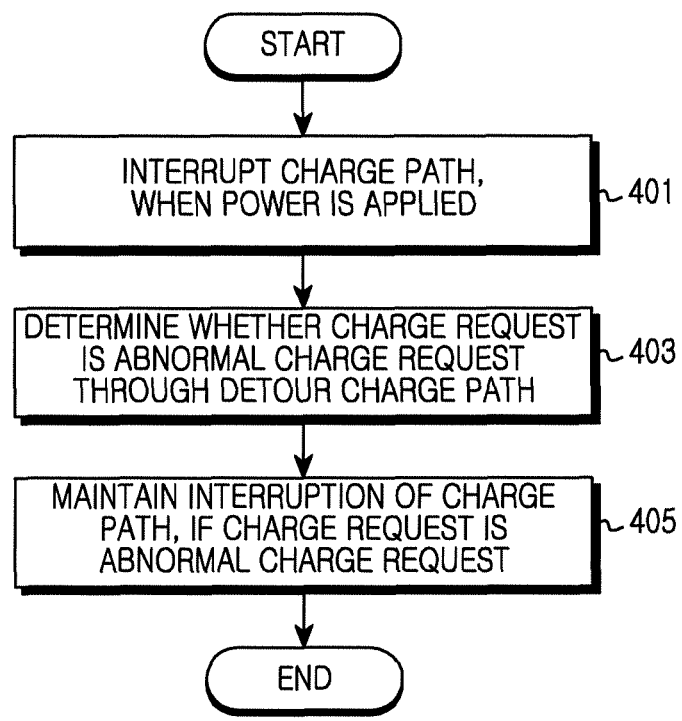
FIG. 4 is a flowchart illustrating a procedure for controlling an abnormal charge request in an electronic device according to various exemplary embodiments of the present disclosure.

FIG. 4 is a flowchart illustrating a procedure for controlling an abnormal charge request in an electronic device according to various exemplary embodiments of the present disclosure.

Referring to FIG. 4, when power is applied, the electronic device may interrupt a charge path in operation 401. According to an exemplary embodiment, as shown in FIG. 2, when the AC power input unit 220 is connected to the power supply device 260, the controller 210 controls the switch 240 to interrupt a charge path between the AC/DC converter 230 and the output unit 250. According to an exemplary embodiment, as the switch 240 sets interruption of a connection path between the AC/DC converter 230 and the output unit 250 as basic setting without a separate control of the controller 210, even if an abnormal charge request occurs by the foreign substance 290, the switch 240 may prevent charge power (e.g., DC power) from unconditionally providing. According to an exemplary embodiment, the switch 240 may be formed with an FET element.

The electronic device may determine whether a charge request is an abnormal charge request through a detour charge path in operation 403. According to an exemplary embodiment, as shown in FIG. 2, the controller 210 may interrupt a charge path between the AC/DC converter 230 and the output unit 250 and determine whether an abnormal charge request occurs through a detour charge path that passes through the controller 210. According to an exemplary embodiment, the controller 210 may determine whether an abnormal charge request occurs based on a change of a current or a voltage.

If a charge request is an abnormal charge request, the electronic device may maintain interruption of a charge path in operation 401. According to an exemplary embodiment, as shown in FIG. 2, when it is recognized that a charge request is an abnormal charge request based on a change of a current or a voltage, the controller 210 may control to maintain charge path interruption between the AC/DC converter 230 and the output unit 250 through the switch 240.

Figure 5:
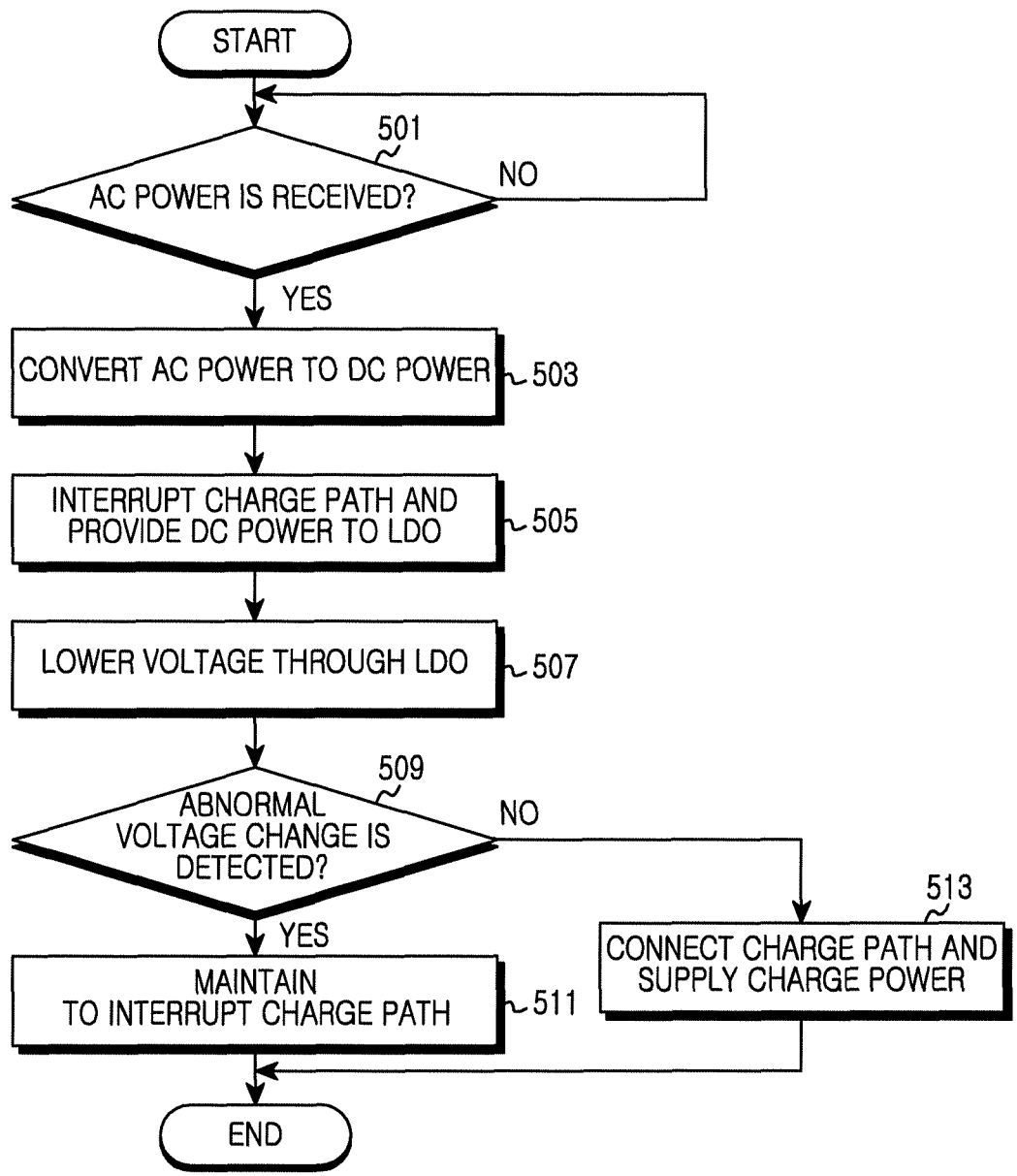
FIG. 5 is a flowchart illustrating a procedure for controlling an abnormal charge request based on a voltage change in an electronic device according to various exemplary embodiments of the present disclosure.

FIG. 5 is a flowchart illustrating a procedure for controlling an abnormal charge request based on a voltage change in an electronic device according to various exemplary embodiments of the present disclosure.

Referring to FIG. 5, the electronic device may determine whether AC power is received in operation 501. According to an exemplary embodiment, as shown in FIG. 3, the electronic device may determine whether the AC power input unit 301 is connected to the power supply device 351.

If AC power is not received, the electronic device may continue to determine whether AC power is received.

If AC power is received, the electronic device may convert AC power to DC power in operation 503. According to an exemplary embodiment, as shown in FIG. 3, when the AC power input unit 301 is connected to the power supply device 351, the AC power input unit 301 may provide the received AC power to the AC/DC converter 303 through a connection path. According to an exemplary embodiment, the AC/DC converter 303 may convert AC power received from the AC power input unit 301 to DC power. According to an exemplary embodiment, it may be assumed that a voltage of DC power converted by the AC/DC converter 303 is a voltage converted based on a charge voltage that can be charged by the charge target device 353. According to an exemplary embodiment, a charge voltage that can be charged by the charge target device 353 may be 5V.

The electronic device may interrupt a charge path and provide DC power to the LDO 311 in operation 505. According to an exemplary embodiment, as shown in FIG. 3, the controller 331 controls the first switch 305 to interrupt a connection path between the AC/DC converter 303 and the output unit 307. According to an exemplary embodiment, as the first switch 305 sets interruption of a connection path between the AC/DC converter 303 and the output unit 307 as basic setting without a separate control of the controller 331, even if an abnormal charge request occurs by the foreign substance 355, the first switch 305 may prevent charge power (e.g., DC power) from unconditionally providing. According to an exemplary embodiment, the first switch 305 may be formed with an FET element. According to an exemplary embodiment, the AC/DC converter 303 may provide the converted DC power to the LDO 311 through a connection path.

The electronic device may lower a voltage through the LDO 311 in operation 507. According to an exemplary embodiment, as shown in FIG. 3, the LDO 311 may lower and provide a voltage of DC power received from the AC/DC converter 303 to a predetermined level. According to an exemplary embodiment, when a chargeable voltage of the charge target device 353 is 5V, the AC/DC converter 303 converts AC power received from the AC power input unit 301 to 5V and provides 5V to the LDO 311, and in this case, in order to determine whether an abnormal charge request occurs by the foreign substance 355 other than the charge target device 353, the LDO 311 may provide a voltage (e.g., 3V) lower than 5V, which is a normal charge voltage.

The electronic device may determine whether an abnormal voltage change is detected and determine whether a charge request is an abnormal charge request in operation 509. According to an exemplary embodiment, as shown in FIG. 3, the comparator 321 may compare the measured voltage 315 and the reference voltage 323 and determine whether an abnormal charge request occurs by the foreign substance 355. According to an exemplary embodiment, the comparator 321 receives a voltage of 3V from the LDO 311, when the first resistor 313 and the second resistor 317 have 10 kΩ as equivalent resistance, the normal voltage 315 may be 1.5V. When resistance occurs by the foreign substance 355, the voltage 315 may be measured as a voltage lower than 1.5V, and in this case, it may recognize that an abnormal charge request has occurred through comparison with the reference voltage 323. That is, in a voltage lower than 5V, because the charge target device 353 cannot be charged, a voltage change in a voltage lower than 5V may be recognized as an abnormal charge request.

If a charge request is an abnormal charge request, the electronic device may maintain to interrupt a charge path in operation 511. As shown in FIG. 3, when it is recognized that an abnormal charge request has occurred by the foreign substance 355 through the comparator 321, the controller 331 controls the first switch 305 to maintain interruption of a connection path between the AC/DC converter 303 and the output unit 307.

If a charge request is a normal charge request, the electronic device may connect a charge path and supply charge power in operation 513. According to an exemplary embodiment, as shown in FIG. 3, when it is recognized that a normal charge request has occurred through the comparator 321, the controller 331 may control the first switch 305 to connect a connection path between the AC/DC converter 303 and the output unit 307 to supply DC power to the charge target device 353. According to an exemplary embodiment, the controller 331 may control the second switch 325 to interrupt a connection path connected to determine whether a charge request is an abnormal charge request. According to an exemplary embodiment, the second switch 325 may be formed with an FET element.

In the foregoing exemplary embodiment, the electronic device may determine whether a charge request is a normal charge request based on whether a voltage is changed.

Figure 6:
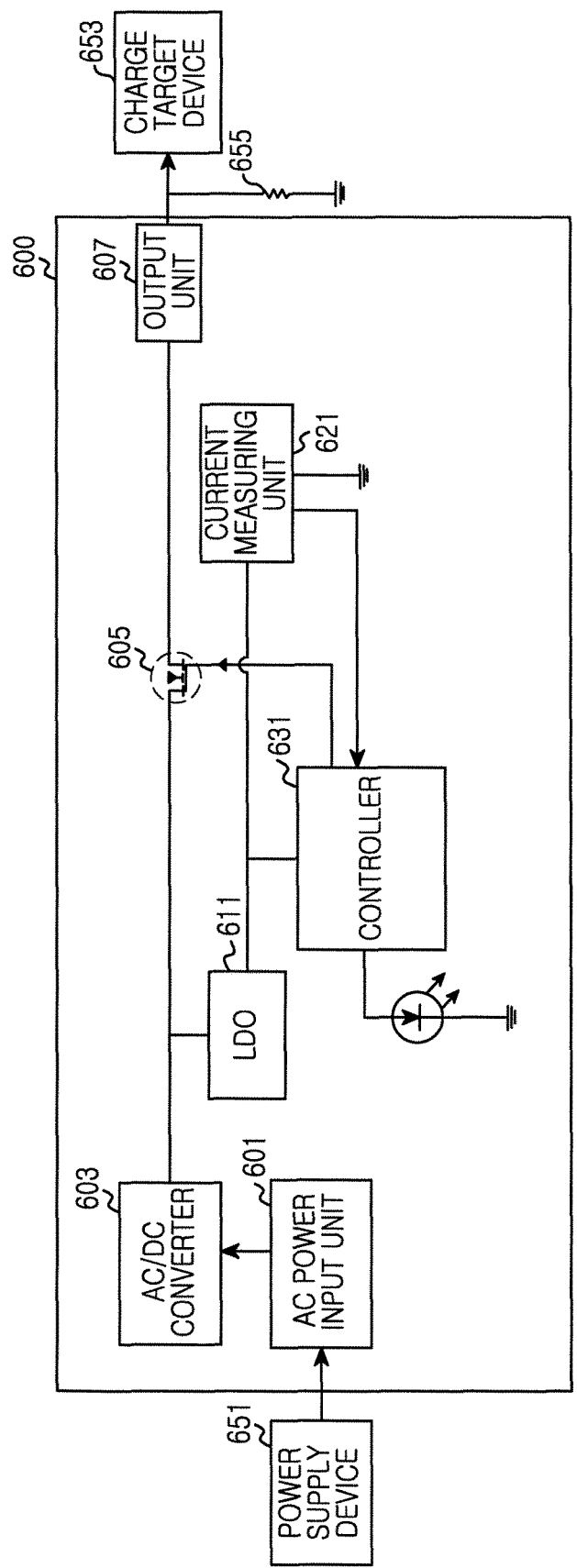
FIG. 6 is a block diagram illustrating a configuration of an electronic device for determining whether a charge request is a normal charge request based on whether a current is changed according to various exemplary embodiments of the present disclosure.

FIG. 6 illustrates a detailed configuration of an electronic device for determining whether a charge request is a normal charge request based on whether a current is changed.

FIG. 6 is a block diagram illustrating a configuration of an electronic device for determining whether a charge request is a normal charge request based on whether a current is changed according to various exemplary embodiments of the present disclosure.

Referring to FIG. 6, an electronic device 600 may include a controller 631, an AC power input unit 601, an AC/DC converter 603, a switch 605, an LDO 611, a current measuring unit 621, and an output unit 607. According to an exemplary embodiment, the electronic device 600 may be a TA charge device.

The AC power input unit 601 may receive an input of AC power from a power supply device 651. In order to connect to the power supply device 651, the AC power input unit 601 may include a plug. According to an exemplary embodiment, when a user inserts a plug of the electronic device 600 into a plug socket or a socket provided at a house, the AC power input unit 601 may receive AC power. The AC power input unit 601 may output AC power received through a connection path to the AC/DC converter 603.

The AC/DC converter 603 may convert AC power received from the AC power input unit 601 to DC power. The AC/DC converter 603 may provide the converted DC power to the LDO 611 or the output unit 607 through a connection path.

The output unit 607 may output DC power received through a connection path to the AC/DC converter 603 to a charge target device 653. The output unit 607 may include a male connector (plug) or a female connector that can electrically connect to a connector of the charge target device 653. The output unit 607 may include a male connector (plug) or a female connector that can electrically connect to a connector of a cable. The output unit 607 may include a cable having a male connector (plug) or a female connector in an end portion. According to an exemplary embodiment, the male connector or the female connector of the output unit 607 may include a plurality of terminals.

The switch 605 may interrupt or connect a connection path between the AC/DC converter 603 and the output unit 607 according to the control of the controller 631. According to an exemplary embodiment, as the switch 605 sets interruption of a connection path between the AC/DC converter 603 and the output unit 607 as basic setting, even if an abnormal charge request occurs by a foreign substance 655, the switch 605 may prevent charge power (e.g., DC power) from unconditionally providing. According to an exemplary embodiment, the switch 605 may be formed with an FET element.

The LDO 611 may lower and provide a voltage of DC power received from the AC/DC converter 603 to a predetermined level. According to an exemplary embodiment, when a chargeable voltage of the charge target device 653 is 5V, the AC/DC converter 603 converts AC power received from the AC power input unit 601 to 5V and provides 5V to the LDO 611, and in this case, in order to determine whether an abnormal charge request occurs by the foreign substance 655 other than the charge target device 653, the LDO 611 may provide a voltage (e.g., 3V) lower than 5V, which is a normal charge voltage.

The current measuring unit 621 may determine whether an abnormal charge request occurs by the foreign substance 655 based on a change of a current. According to an exemplary embodiment, when a voltage of 3V is received from the LDO 611, in a voltage lower than 5V, the charge target device 653 cannot be charged and thus a current change in 3V may be recognized as an abnormal charge request.

The controller 631 may determine whether a charge request from the charge target device 653 is a normal charge request based on whether a current is changed and control to supply DC power to the charge target device 653. According to an exemplary embodiment, as shown in FIG. 6, when it is recognized that an abnormal charge request has occurred by the foreign substance 655 through the current measuring unit 621, the controller 631 controls the switch 605 to maintain interruption of a connection path between the AC/DC converter 603 and the output unit 607. According to an exemplary embodiment, when it is recognized that a normal charge request has occurred through the current measuring unit 621, the controller 631 may control the switch 605 to connect a connection path between the AC/DC converter 603 and the output unit 607 to supply DC power to the charge target device 653.

Although not shown, the electronic device 600 may include at least one of a display, an indicating lamp, a speaker, and a vibration generator notifying an abnormal charge request.

Figure 7:
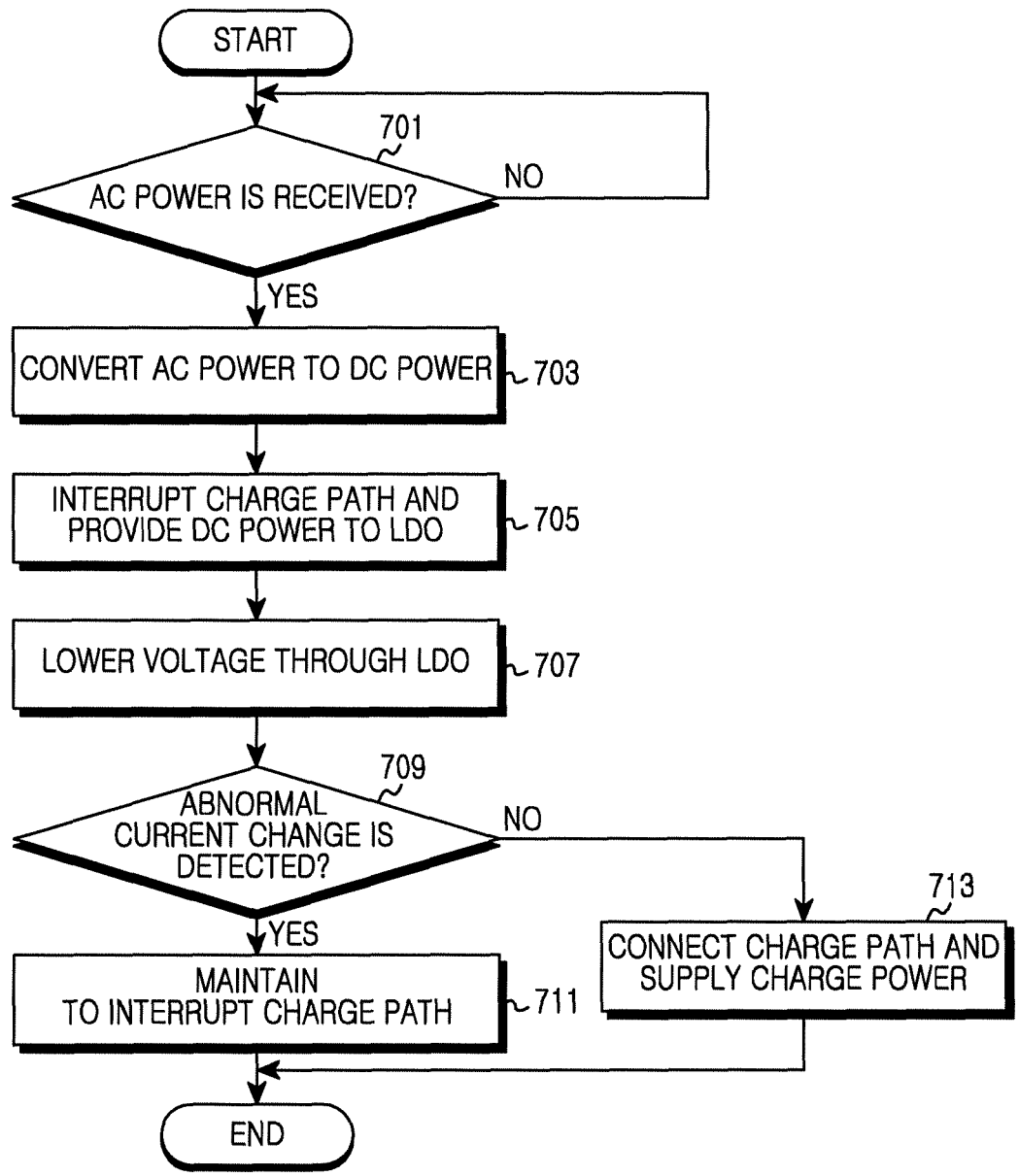
FIG. 7 is a flowchart illustrating a procedure for controlling an abnormal charge request based on whether a current is changed in an electronic device according to various exemplary embodiments of the present disclosure.

FIG. 7 is a flowchart illustrating a procedure for controlling an abnormal charge request based on whether a current is changed in an electronic device according to various exemplary embodiments of the present disclosure.

Referring to FIG. 7, the electronic device may determine whether AC power is received in operation 701. According to an exemplary embodiment, as shown in FIG. 6, the electronic device may determine whether the AC power input unit 601 is connected to the power supply device 651.

If AC power is not received, the electronic device may continue to determine whether AC power is received.

If AC power is received, the electronic device may convert AC power to DC power in operation 703. According to an exemplary embodiment, as shown in FIG. 6, when the AC power input unit 601 is connected to the power supply device 651, the AC power input unit 601 may provide the received AC power to the AC/DC converter 603 through a connection path. The AC/DC converter 603 may convert AC power received from the AC power input unit 601 to DC power. According to an exemplary embodiment, it may be recognized that a voltage of DC power converted by the AC/DC converter 603 is a voltage converted based on a charge voltage that can be charged by the charge target device 653. According to an exemplary embodiment, a charge voltage that can be charged by the charge target device 653 may be 5V.

The electronic device may interrupt a charge path and provide DC power to the LDO 611 in operation 705. According to an exemplary embodiment, as shown in FIG. 6, the controller 631 controls the switch 605 to interrupt a connection path between the AC/DC converter 603 and the output unit 607. According to an exemplary embodiment, as the switch 605 sets interruption of a connection path between the AC/DC converter 603 and the output unit 607 as basic setting without a separate control of the controller 631, even if an abnormal charge request occurs by the foreign substance 655, the switch 605 may prevent charge power (e.g., DC power) from unconditionally providing. According to an exemplary embodiment, the switch 605 may be formed with an FET element. According to an exemplary embodiment, the AC/DC converter 603 may provide the converted DC power to the LDO 611 through a connection path.

The electronic device lowers a voltage through the LDO 611 in operation 707. According to an exemplary embodiment, as shown in FIG. 6, the LDO 611 may lower and provide a voltage of DC power received from the AC/DC converter 603 to a predetermined level. According to an exemplary embodiment, when a chargeable voltage of the charge target device 653 is 5V, the AC/DC converter 603 converts AC power received from the AC power input unit 601 to 5V and provides 5V to the LDO 611, and in this case, in order to determine whether an abnormal charge request occurs by the foreign substance 655 other than the charge target device 653, the LDO 611 may provide a voltage (e.g., 3V) lower than 5V, which is a normal charge voltage.

The electronic device may determine whether an abnormal current change is detected and determine whether a charge request is an abnormal charge request in operation 709. According to an exemplary embodiment, as shown in FIG. 6, the current measuring unit 621 may determine whether an abnormal charge request occurs by the foreign substance 655 based on a change of a current. According to an exemplary embodiment, when a voltage of 3V is received from the LDO 611, in a voltage lower than 5V, the charge target device 653 cannot be charged and thus a current change in 3V may be recognized as an abnormal charge request.

If a charge request is an abnormal current change, the electronic device may maintain to interrupt a charge path in operation 711. According to an exemplary embodiment, as shown in FIG. 6, when it is recognized that an abnormal charge request has occurred by the foreign substance 655 through the current measuring unit 621, the controller 631 controls the switch 605 to maintain interruption of a connection path between the AC/DC converter 603 and the output unit 607.

If a charge request is a normal current change, the electronic device may connect a charge path and supply charge power in operation 713. According to an exemplary embodiment, as shown in FIG. 6, when it is recognized that a normal charge request has occurred through the current measuring unit 621, the controller 631 may control the switch 605 to connect a connection path between the AC/DC converter 603 and the output unit 607 to supply DC power to the charge target device 653.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs software modules, the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

By detecting an abnormal charge request based on a change of a current or a voltage through a detour charge path in a charge device, fire and an erroneous operation of a charge device according to the abnormal charge request can be prevented.

While the present disclosure has been particularly shown and described with reference to exemplary embodiments thereof, it will be understood by those skilled in the art that various changes in form and details may be made therein without departing from the spirit and scope of the present disclosure as defined by the appended claims. Therefore, the scope of the present disclosure is not limited to the described exemplary embodiment but should be determined by the appended claims and their equivalents.

What is claimed is:

1. A charge device, comprising:
a Low Drop Out (LDO) configured to convert a reference voltage to a detection voltage for detecting an abnormal charge request;
a switch configured to disconnect or connect a charge path with an external device; and
a processor, the processor is configured to:
disconnect the charge path with the external device by control of the switch in a non-charging operation,
determine a normal voltage based on the detection voltage in a charging operation,
determine whether a charge request is the abnormal charge request based on whether the normal voltage is changed,
control to maintain disconnection of the charge path by the switch, in response to determining that the charge request is the abnormal charge request, and
control to connect of the charge path by the switch, in response to determining that the charge request is a normal charge request.

2. The charge device of claim 1, wherein the switch comprising a Field Effect Transistor (FET) element.

3. The charge device of claim 1, wherein the switch is configured to establish a detour charge path through the processor in response to disconnecting the charge path with the external device,
wherein the processor is configured to control to:
interrupt the detour charge path, if the charge request is the normal charge request and
control the switch to connect the charge path with the external device.

4. The charge device of claim 1, wherein the processor is configured to compare a set voltage to a measured voltage for measuring based on the detection voltage; and determine the charge request to the abnormal charge request, if the set voltage is different from the measured voltage.

5. The charge device of claim 1, further comprising at least one of a display, an indicating lamp, a speaker, and a vibration generator configured to provide a notification of the abnormal charge request.

6. The charge device of claim 1, wherein the reference voltage is a chargeable voltage of the external device,
wherein the detection voltage is set to a voltage lower that the reference voltage.

7. The charge device of claim 1, wherein the normal voltage is a set voltage that is normally measured based on the detection voltage, if the charge request is the normal charge request.

8. The charge device of claim 1, wherein the processor is configured to determine a change of the normal voltage, if the detection voltage is measured a voltage lower than a set voltage due to resistance of a foreign substance.

9. The charge device of claim 1, further comprising a current measuring unit,
wherein the processor is configured to determine whether the charge request is the abnormal charge request based on a change of a current by the current measuring unit.

10. A method of controlling charge in a charge device, the method comprising:
disconnecting a charge path, with an external device by control of a switch of the charge device in a non-charging operation;
determining a normal voltage based on a detection voltage in a charging operation;
determining whether a charge request is an abnormal charge request based on whether the normal voltage is changed;
maintaining disconnection of the charge path by the switch in response to determining that the charge request is an abnormal charge request; and
connecting the charge path by the switch, in response to determining that the charge request is a normal charge request.

11. The method of claim 10, wherein determining whether the charge request is the abnormal charge request comprises comparing a set voltage to a measured voltage for measuring based on a reference voltage; and determining the charge request to the abnormal charge request, if the set voltage is different from the measured voltage.

12. The method of claim 10, further comprising notifying, in response to determining that the charge request is the abnormal charge request, the abnormal charge request through at least one of a display, an indicating lamp, a speaker, and a vibration generator.

13. The method of claim 11, wherein the reference voltage is a chargeable voltage of the external device,
wherein the detection voltage is set to a voltage lower that the reference voltage.

14. The method of claim 10, wherein the switch is configured to establish a detour charge path through a processor in response to disconnecting the charge path with the external device,
further comprising disconnecting the detour charge path if the charge request is the normal charge request; and controlling the switch to connect the charge path with the external device.

15. The method of claim 14, further comprising converting a reference voltage to the detection voltage for detecting the abnormal charge request using a Low Drop Out (LDO) element.

16. The method of claim 10, further comprising determining a change of the normal voltage, if the detection voltage is measured a voltage lower than a set voltage due to resistance of a foreign substance.

17. A non-transitory computer-readable medium comprising instructions, that when executed by at least one processor, cause a charge device to:
disconnect a charge path, with an external device by control of a switch of the charge device in a non-charging operation;
determine a normal voltage based on a detection voltage in a charging operation;
determine whether a charge request is an abnormal charge request based on whether the normal voltage is changed;
maintain disconnection of the charge path by the switch in response to determining that the charge request is an abnormal charge request; and
connect the charge path by the switch, in response to determining that the charge request is a normal charge request.

18. The computer-readable medium of claim 17, wherein the instructions for determining whether the charge request is the abnormal charge request comprise instructions, that when executed by at least one processor, cause the charge device to compare a set voltage to a measured voltage for measuring based on a reference voltage; and determine the charge request to the abnormal charge request, if the set voltage is different from the measured voltage.

19. The computer-readable medium of claim 17, further comprising instructions, that when executed by at least one processor, cause the charge device to notify, in response to determining that the charge request is the abnormal charge request, the abnormal charge request through at least one of a display, an indicating lamp, a speaker, and a vibration generator.

20. The computer-readable medium of claim 17, wherein the switch is configured to establish a detour charge path through the processor in response to disconnecting the charge path, with the external device,
further comprising instructions, that when executed by at least one processor, cause the charge device to disconnect the detour charge path if the charge request is a normal charge request, and control the switch to connect the charge path with the external device.

* * * * *